Nov. 6, 1934.  G. D. BRADSTREET  1,979,821
SPRING SUSPENSION FOR MOTOR VEHICLES
Filed Sept. 8, 1933   2 Sheets-Sheet 1
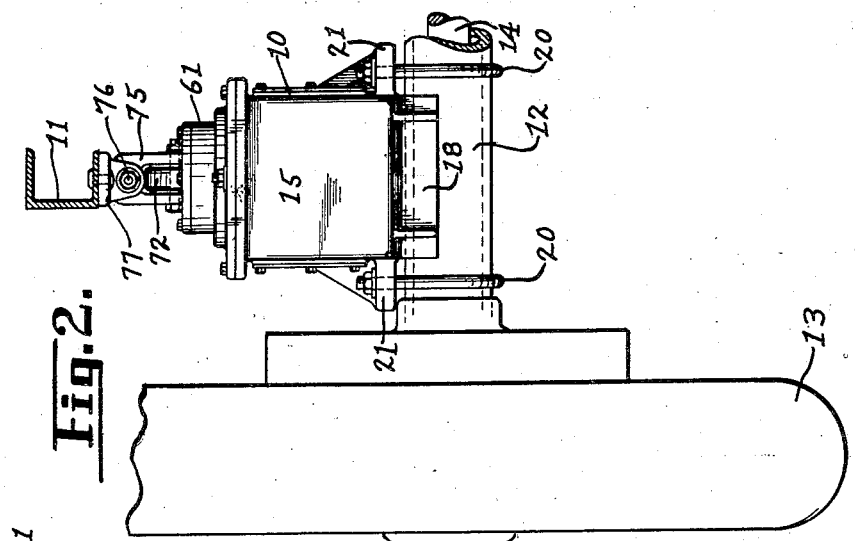
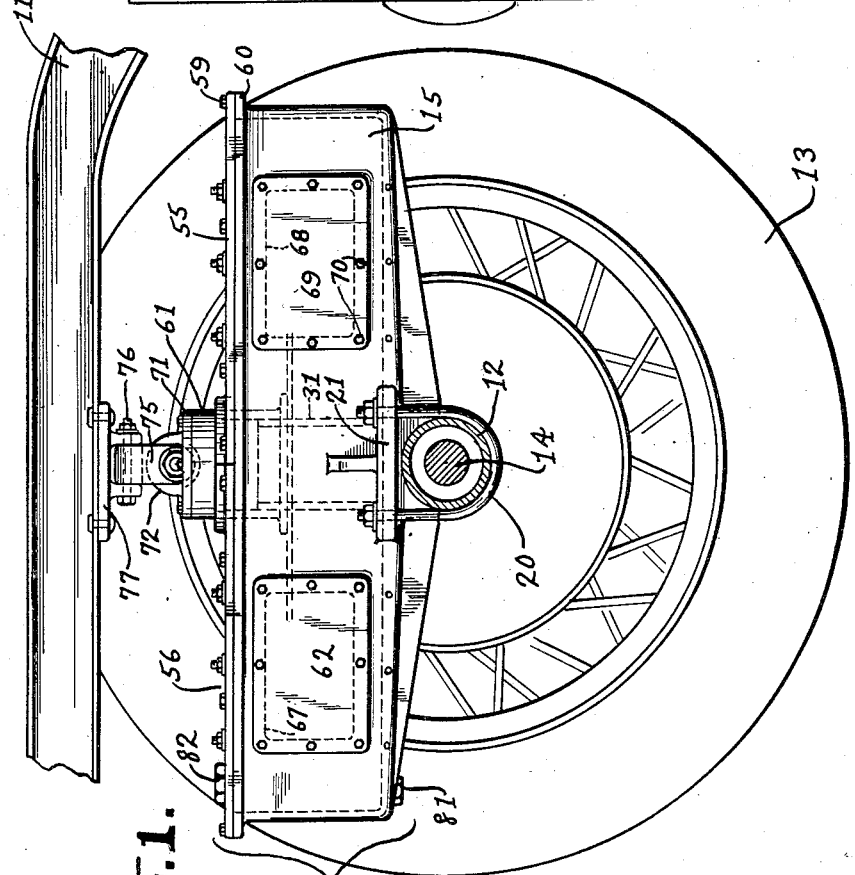
INVENTOR
George D. Bradstreet
BY
H. G. Manning
ATTORNEY

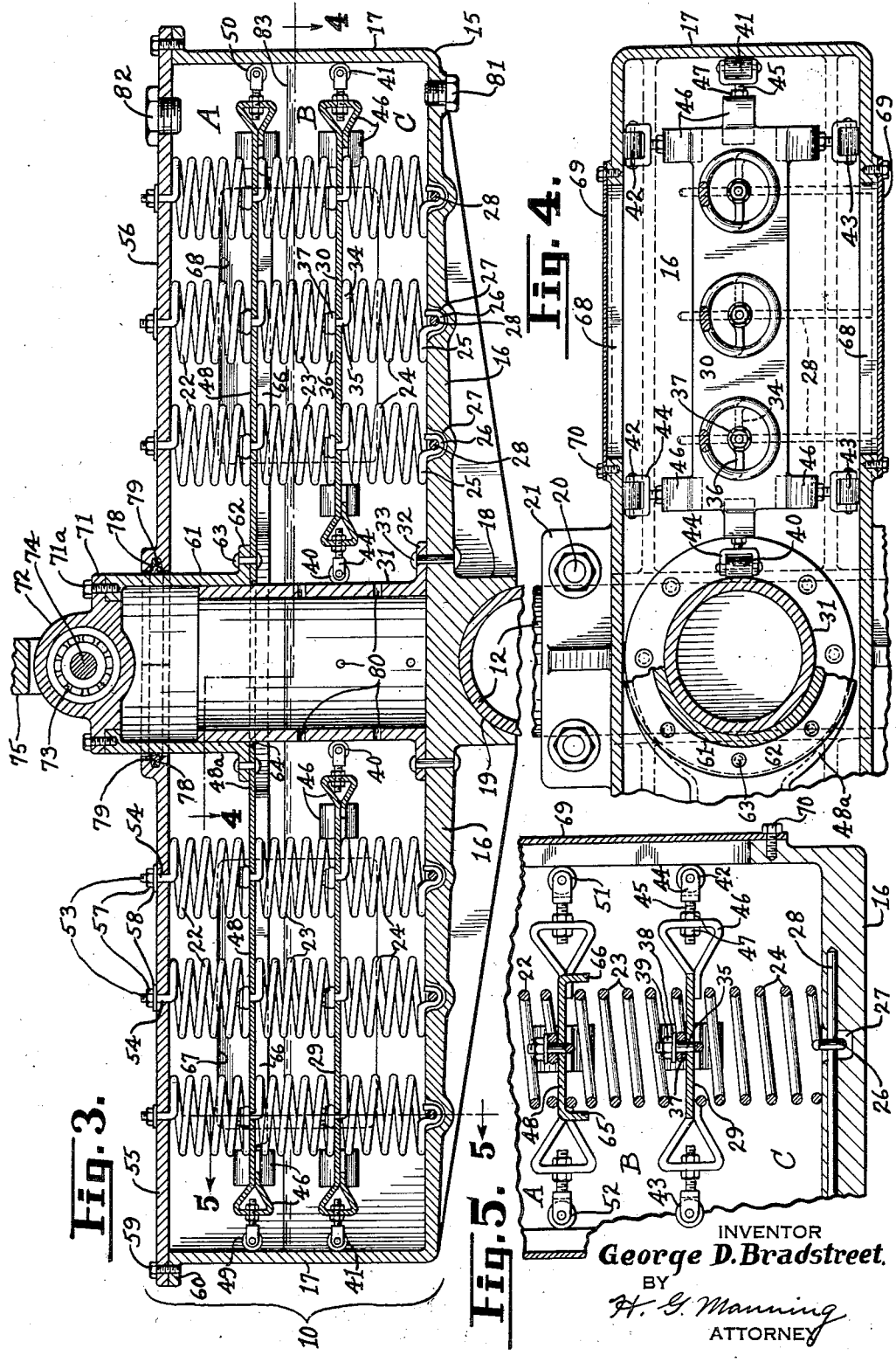

Patented Nov. 6, 1934

1,979,821

UNITED STATES PATENT OFFICE 1,979,821

SPRING SUSPENSION FOR MOTOR VEHICLES

George D. Bradstreet, Thomaston, Conn.

Application September 8, 1933, Serial No. 688,615

14 Claims. (Cl. 267—60)

This invention relates to spring suspensions for motor vehicles and the like, and more particularly to a suspension means employing the use of a plurality of helical springs housed within a lubricant filled casing.

One object of this invention is to provide a spring suspension apparatus of the above nature in which the spring will have no frictional contact with other metal parts.

A further object is to provide a spring suspension apparatus of the above nature having three tiers of superimposed helical springs, said tiers being separated by floating plates having roller-bearing engagement with the inner side walls of the surrounding casing.

A further object is to provide a spring suspension of the above nature which will be simple in construction, inexpensive to manufacture, easy to install and manipulate, compact, and very efficient and durable in use.

With these and other objects in view there has been illustrated on the accompanying drawings, one form in which the invention may be conveniently embodied in practice.

In the drawings:

Fig. 1 represents a side elevation of a spring suspension apparatus as it appears when installed between the frame and axle of a motor vehicle.

Fig. 2 is a rear end elevation of the same.

Fig. 3 is a vertical longitudinal sectional view through the suspension apparatus.

Fig. 4 is a fragmentary horizontal sectional view of the same, taken along the line 4—4 in Fig. 3, looking in the direction of the arrows.

Fig. 5 is a fragmentary transverse sectional view of the same, taken along the line 5—5 of Fig. 3, looking in the direction of the arrows.

Referring now to the drawings in which like reference numerals denote corresponding parts throughout the several views, the numeral 10 indicates generally the spring suspension apparatus which is adapted to be connected between the frame 11 and the axle housing 12 of a motor vehicle. The axle housing 12 is of standard construction and is supported on a traction wheel 13 mounted on an axle 14.

The spring mechanism proper is enclosed in a rectangular shaped housing or casing 15 comprising a base 16 and four upstanding walls 17. The base 16 is provided with an integral depending supporting block 18 having a section cut out at 19 to conform to the shape of the axle housing 12. The casing 15 is held rigid upon the housing 12 by means of a pair of U-bolts 20 clamped about said housing 12 and having their threaded ends secured to a pair of flanges 21 formed integral with said casing 15 and extending from opposite sides thereof (see Figs. 1 and 2).

The casing 15 is adapted to enclose three tiers of springs indicated by the letters A, B and C, each tier being herein shown as comprising six springs indicated by the numerals 22, 23 and 24, respectively. The springs of the two lower tiers B and C are of the "compression" type, while the springs of the upper tier A are of the recoil or "tension" type.

In order to secure the springs 24 of the lower tier C to the base 16 of the casing 15, the lower convolution of each of said springs 24 is formed with a radial inturned section 25 having a depending hook 26 upon its extremity. The hooks 26 are adapted to fit within corresponding recesses 27 formed in the upper face of said base 16, and are held therein by means of six elongated pins 28 passing transversely through the base 16 as best shown in Fig. 5.

Located between the two lower tiers of springs B and C are a pair of floating plates 29 and 30 positioned on opposite sides of a central tubular guide cylinder 31 which is provided with a pedestal flange 32 adapted to be secured to the base 16, as by rivets 33.

The springs 23 and 24 of the tiers B and C are fastened securely to the floating plates 29 and 30 in the following manner. The upper convolution of each spring 24 has a radial inturned arm 34, the extremity 35 of which is threaded and bent upwardly along the axle of said springs 24, and said bent extremities are adapted to project through corresponding apertures provided in the plates 29 and 30. The lower convolutions of the superimposed springs 23 are similarly provided with radial inturned arms 36, the ends of which are formed into eyes 37. Each eye 37 is adapted to be slipped over the threaded extremity 35 of the subjacent spring 24 and is adapted to be locked in position by means of a washer 38 and nut 39, as shown in Fig. 5.

In order to prevent the springs 23 and 24 from being deflected outwardly under compression, the floating plates 29 and 30 are provided upon the opposite ends thereof with a pair of roller bearings 40 and 41, and said plates have another pair of lateral roller bearings 42 and 43 on each longitudinal side. The bearings 40, 41, 42, and 43 inclusive are each pivotally mounted in bifurcated brackets 44 provided with integral threaded shanks 45 adapted to pass through six suitable apertures, respectively, provided in the outer ends of six triangular-shaped looped members 46 formed integral with and projecting from the body of the floating plates 29 and 30, said triangular members being spaced about said plates 29 and 30 in the manner clearly shown in Fig. 4.

The outer end roller bearings 41 and the two pairs of lateral roller bearings 42 and 43 are adapted to adjustably engage against the adjacent surface of the walls 17 of the casing 15, while the inner end rollers 40 are adjustably engaged against the cylindrical surface of the guiding cylinder 31. Each of the rollers is adapted to be locked in adjustable position by means of a pair of opposed nuts 47 threaded on the shanks 45 of the members 44 and engaging against opposite surfaces of said brackets 46.

An elongated buffer plate 48 is located above the floating plates 29 and 30 between the tiers of springs 22 and 23 and extends throughout substantially the entire horizontal expanse of the casing 15. The opposite ends of the buffer plate 48 are provided with a pair of adjustable roller end bearings 49 and 50, and a pair of lateral adjustable bearings 51 and 52, all of said bearings 49, 50, 51 and 52 being mounted and adapted to function in all respects similarly to the bearings 40, 41, 42 and 43, previously described.

The ends of the springs 22 and 23 adjacent the buffer plate 48 are attached thereto in the same manner as the attachment of the springs 23 and 24 to the floating plates 29 and 30. The upper ends 53 of the tension springs 22 project through apertures 54 provided in a pair of cover plates 55 and 56 and are detachably locked thereto, as by means of nuts 57 and washers 58. The cover plates 55 and 56 are detachably secured by screws 59 to a peripheral outer flange 60 cast integral with the upper edge of the casing 15.

In order to transmit shocks from the vehicle frame 11 to the compression springs 23 and 24, provision is made of a load supporting tubular plunger 61 telescopically fitted around the guide cylinder 31. The lower end of the plunger 61 is provided with an annular integral flange 62 by means of which it is supported upon an enlarged circular section 48a of the buffer plate 48 and is anchored thereto by means of a series of rivets 63. The circular section 48a is adapted to loosely surround the guide cylinder 31 and is provided with a central aperture 64.

To give added strength to the buffer plate 48 and prevent the same from bending or buckling under the weight of the vehicle or other forces exerted upon it, provision is made of a pair of side depending flanges 65 and 66 integrally formed along the longitudinal edges of said plate 48.

A pair of rectangular openings 67 and 68 are formed in each of the longitudinal side walls 17 of the casing 15 on opposite sides thereof for the purpose of permitting access to the interior of the casing 15 for making adjustments and minor repairs without the necessity of disassembling the entire suspension apparatus. The openings 67 and 68 are normally closed by sealing plates 69 detachably secured to the walls 17 of the casing 15, as by means of screws 70.

The exterior plunger 61 is adapted to extend upwardly through the cover plates 55 and 56 and has a head plate 71 fitted into its upper extremity and secured thereto, as by screws 71a. The head plate 71 is provided with a transverse cylindrical section or hub 72 for the reception of a roller bearing 73 mounted therein. A shackle bolt 74 is mounted within the bearing 73 and is connected to the bifurcated arms of a shackle member 75, the latter in turn being pivotally attached by means of a bolt 76 to a hanger block 77 attached to the under side of the chassis frame 11.

In order to prevent dust or other foreign matter from entering the casing 15 around the exterior plunger 61, the edges of the covers 55 and 56 surrounding said plunger 61 are provided with cooperating grooved sections 78 for holding a fibrous oil-retaining ring 79 which is adapted to frictionally engage the outer cylindrical surface of the plunger 61.

The inner guide cylinder 31, as most clearly shown in Fig. 3, is provided with rows of staggered holes 80 to permit the oil contained in the lower part of the casing 15 to pass in and out of the central hollow chamber of said guide cylinder 31 during the reciprocating motions of the plunger 61. The casing 15 should preferably be kept substantially half full of free flowing lubricating oil which may be drawn off, if desired, by removing a drain plug 81 threadedly engaged in one end of the base 16 of said casing 15. Oil may be introduced into the casing 15 through a suitable refill aperture provided in the cover 56 adapted to be sealed by a filler cap 82.

*Operation*

In the operation of the vehicle the weight of the chassis frame 11 will force the external plunger 61 downwardly around the guiding cylinder 31 and cause the buffer plate 48 to uniformly compress the springs 23 and 24 in the tiers B and C and at the same time tension the springs 22 in the tier A. Shocks encountered by the running gear of the vehicle will thus be smoothly and easily absorbed.

If for any reason the body supporting frame 11 and the axle housing 12 are subjected to unusual shocks, as when the wheels 13 of the vehicle suddenly drop into a depression in the roadway, or when the frame returns beyond its normal position due to the rebound therefrom, the forces exerted in the springs 22 in the tier A will be of opposite characteristics from the forces exerted in the springs 23 and 24 in the tiers B and C.

It will be understood that the telescopic plunger 61 and guiding cylinder 31 function in the manner of a dash-pot for dampening the reflex action of the springs. Thus, when the exterior plunger 61 is being forced downwardly, pressure will be created within the chamber confined within the hollow portions of the plunger 61 and guide cylinder 31, tending to force the oil contained therein out through the restricted passages 80. When the plunger 61 rises, a partial vacuum will be created in said chamber to cause oil to be sucked back through said holes 80 from the surrounding casing.

It will also be understood that the agitation of the oil in the casing by road shocks will cause oil to spatter up and lubricate the springs 22 and 23, and all working parts above the surface 83 of said oil.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a spring suspension apparatus for a vehicle, a hollow casing supported upon an axle, a plurality of sets of superimposed interconnected springs arranged in tiers in axial alinement with each other in said casing, the end coils of the superimposed spring units being attached to the top and bottom of said casing, floating plates interposed between adjacent tiers of springs, and anti-friction roller means for guiding said plates in vertical reciprocating motions.

2. In a spring suspension apparatus for a vehicle, a hollow casing for support upon the running gear of said vehicle, a series of helical springs arranged in tiers in superimposed axial alinement with each other, floating plates interposed between adjacent tiers and attached to the adjacent coils of said springs for retaining said superimposed springs in axial alinement, roller bearings mounted on the edges of said plates for engagement with the inner walls of said casing, a plunger attached to the uppermost floating plate extending upwardly out of said casing, and means for connecting said plunger with the frame of said vehicle.

3. In a spring suspension apparatus for a vehicle, a hollow casing for support upon the running gear of said vehicle, a series of helical springs arranged in tiers in superimposed axial alinement with each other, floating plates interposed between adjacent tiers and connected to the adjacent coils of said springs, roller bearings adjustably mounted on the edges of said plates for engagement with the inner walls of said casing, a plunger attached to the uppermost floating plate extending upwardly out of said casing, and means for connecting said plunger with the frame of said vehicle.

4. In a spring suspension apparatus for a vehicle, a hollow casing for support upon the running gear of said vehicle, a plurality of helical springs arranged in three tiers in superimposed axial alinement with respect to each other, a pair of floating plates interposed between each two adjacent tiers and secured to the adjacent coils of said springs, means for anchoring the springs of said bottom tier to the base of said casing, a cover member for sealing said casing, means for anchoring the springs of the upper tier to said cover member, and plunger means projecting through said cover member for connecting the upper floating plate with the body frame of said vehicle.

5. In a spring suspension apparatus for a vehicle, a hollow casing for support upon the running gear of said vehicle, a plurality of helical springs arranged in three tiers in superimposed axial alinement with respect to each other, a pair of floating plates interposed between each two adjacent tiers and detachably secured to the adjacent coils of said springs, means for anchoring the springs of said bottom tier to the base of said casing, a cover member for sealing said casing, means for anchoring the springs of the upper tier to said cover member, relatively slidable telescopic means extending upwardly through said cover member for connecting said upper floating plate with the body frame of said vehicle.

6. In a spring suspension apparatus for a vehicle, a hollow casing for support upon the running gear of said vehicle, a series of helical springs arranged in tiers in superimposed axial alinement with each other, floating plates interposed between adjacent tiers, roller bearings mounted on the edges of said plates for engagement with the inner walls of said casing, a plunger attached to the uppermost floating plate extending upwardly out of said casing, and means for connecting said plunger with the frame of said vehicle, said latter means comprising a ball-bearing and shackle connection.

7. In a spring suspension apparatus for a vehicle, a hollow casing for support upon the running gear of said vehicle, a series of helical springs arranged in tiers in superimposed axial alinement with each other, floating plates interposed between adjacent tiers, roller bearings mounted on the edges of said plates for engagement with the inner walls of said casing, a plunger attached to the uppermost floating plate extending upwardly out of said casing, a ball-bearing member positioned on the top of said plunger, and shackle means connecting said bearing with the frame of said vehicle.

8. In a spring suspension apparatus for a vehicle, a hollow elongated casing, central guide means mounted upon the base of said casing, a plunger member having telescopic engagement with said central guide means and projecting through the cover of said casing for attachment to the vehicle frame, a series of springs arranged in tiers in superimposed axial alinement within said casing on opposite sides of said guide means, floating plates interposed between said adjacent tiers and attached to the adjacent coils of said springs, one of said plates being associated with said plunger member, and means on said plates for engaging the inner walls of said casing for retaining the vertical alinement of said superimposed springs.

9. In a spring suspension apparatus for a vehicle, a hollow elongated casing, central guide means mounted upon the base of said casing, a plunger member having telescopic engagement with said central guide means and projecting through the cover of said casing for attachment to the vehicle frame, a series of springs arranged in tiers in superimposed axial alinement within said casing on opposite sides of said guide means, floating plates interposed between said adjacent tiers and attached to the adjacent coils of said springs, the uppermost of said plates being associated with said plunger member, and guide means comprising a series of opposed roller bearings adjustably mounted on the edges of said plate for engagement with the inner walls of said casing, whereby said plates will be constrained to move only vertically in order to preserve the vertical alinement of said superimposed springs.

10. In a spring suspension apparatus for a vehicle, a hollow elongated casing having a cover, a guide cylinder upstanding from the base of said casing, a tubular plunger having telescopic engagement upon the exterior of said cylinder and projecting through the cover of said casing for attachment to the vehicle frame, a series of springs arranged in tiers in said casing, and floating plates interposed between the adjacent tiers of said springs, the uppermost plate extending substantially the entire expanse of said casing and forming a supporting seat for said tubular plunger.

11. In a spring suspension apparatus for a vehicle, a hollow casing having a cover, a plurality of sets of superimposed springs arranged in tiers in vertical axial alinement with each other in said casing, floating plates interposed between the springs of said sets, the uppermost plate being connected with the vehicle frame, means for detachably interconnecting the adjacent coils of said sets of springs through said plates, and means for detachably securing the outer coils of said superimposed springs to the base and cover of said casing, whereby the strain on the springs below the upper tier will be diminished by said upper springs.

12. In a spring suspension apparatus for a vehicle, a hollow casing, a plurality of coiled springs arranged in tiers in said casing, floating plates interposed between the upper and lower tiers of springs, one of said plates being connected with the vehicle frame and means for anchoring the ends of said springs to said interposed plates and to said cover and to the bottom wall of said casing respectively.

13. In a spring suspension apparatus for a vehicle, a hollow casing, a plurality of sets of superimposed springs arranged in tiers in axial alinement with each other in said casing, floating plates interposed between said tiers of said springs, the uppermost plate being connected with the vehicle frame, and means for connecting the adjacent coils of said springs with said floating plates and the upper and lower walls of said casing, whereby each set of superimposed springs will be retained in axial alinement, and whereby said lower springs will be under compression when said upper springs are under tension, and vice versa.

14. In a spring suspension apparatus for a vehicle, a hollow casing having a cover, a plurality of sets of superimposed springs arranged in tiers in vertical axial alinement with each other in said casing, floating plates interposed between the springs of said sets and yieldable in response to the vertical movement of the vehicle frame, means for interconnecting the adjacent coils of said sets of springs through said plates, and means for securing the outer coils of said superimposed springs to the base and cover of said casing, whereby said lower springs will be under compression when said upper springs are under tension, and vice versa.

GEORGE D. BRADSTREET.